(12) United States Patent
Vidal

(10) Patent No.: US 8,136,707 B2
(45) Date of Patent: Mar. 20, 2012

(54) COMPENSATING PRESSURE CONTROLLER FOR FLUID DISPENSER AND METHOD

(75) Inventor: Michael A. Vidal, North Attleboro, MA (US)

(73) Assignee: Nordson Corporation, Westlake, OH (US)

( * ) Notice: Subject to any disclaimer, the term of this patent is extended or adjusted under 35 U.S.C. 154(b) by 1396 days.

(21) Appl. No.: 11/278,465

(22) Filed: Apr. 3, 2006

(65) Prior Publication Data

US 2006/0163277 A1 Jul. 27, 2006

Related U.S. Application Data

(63) Continuation of application No. PCT/US2004/032974, filed on Oct. 6, 2004.

(60) Provisional application No. 60/509,221, filed on Oct. 6, 2003.

(51) Int. Cl.
*B67D 7/08* (2010.01)

(52) U.S. Cl. ............. 222/639; 222/55; 222/61; 222/389

(58) Field of Classification Search .................... 222/55, 222/61, 389, 638–642
See application file for complete search history.

(56) References Cited

U.S. PATENT DOCUMENTS

| 3,880,331 | A | * | 4/1975 | Perkins | .......................... 222/327 |
| 4,932,840 | A | | 6/1990 | Takeuchi et al. | |
| 5,188,258 | A | | 2/1993 | Iwashita | |
| 5,199,607 | A | | 4/1993 | Shimano | |
| 5,277,333 | A | | 1/1994 | Shimano | |
| 5,435,462 | A | | 7/1995 | Fujii | |
| 6,329,013 | B1 | | 12/2001 | Putt | |
| 6,715,506 | B1 | * | 4/2004 | Ikushima | ........................ 137/14 |

FOREIGN PATENT DOCUMENTS

WO 9823932 A1 6/1998

OTHER PUBLICATIONS

Modelling of Time-Pressure Fluid Dispensing Process, X.B. Chen et al., Department of Mechanical Engineering, University of Saskatchewan, vol. 124, Dec. 2002.
European Patent Office, International Search Report and Written Opinion in Corresponding PCT Application No. PCT/US20041032974, Jan. 18, 2005.
The International Bureau of WIPO, International Preliminary Report of Patentability from Corresponding PCT Application No. PCT/US2004/032974, Apr. 10, 2006.

* cited by examiner

*Primary Examiner* — J. Casimer Jacyna
(74) *Attorney, Agent, or Firm* — Wood, Herron & Evans, L.L.P.

(57) ABSTRACT

A fluid dispensing system having a fluid dispenser supporting a barrel containing liquid to be dispensed. The barrel has a slidable piston therein with the liquid on a forward piston side and a chamber on a rear piston side. Positive and negative pressure fluid circuits have components operable to apply respective positive and negative fluid pressures to the rear side of the piston. A pressure transducer is operable to sense a fluid pressure in the chamber; and a dispenser control is operative to store a pressure-time relationship during a first dispensing cycle and thereafter, operate a component in the positive pressure fluid circuit to maintain the pressure-time relationship during a subsequent dispensing cycle.

16 Claims, 6 Drawing Sheets

COMPENSATING PRESSURE CONTROLLER FOR FLUID DISPENSER AND METHOD

CROSS-REFERENCE TO RELATED APPLICATIONS

This application is a continuation of Serial No. PCT/US2004/032974 filed on Oct. 6, 2004 which claims the benefit of U.S. Provisional Application No. 60/509,221 filed on Oct. 6, 2003, the disclosures of which are hereby incorporated by reference herein.

FIELD OF THE INVENTION

The present invention generally relates to fluid dispensing and more particularly, to a fluid dispensing system and process for accurately and consistently dispensing a quantity of fluid.

BACKGROUND OF THE INVENTION

Conventional fluid dispensing systems include automated and hand-held dispensers that support a barrel containing a liquid to be dispensed. With a hand-held dispenser, an operator orients a dispenser tip at a desired location with respect to a substrate and actuates a switch to initiate a dispensing cycle. A control is responsive to the actuated switch and opens a valve to apply pressurized fluid, for example, shop air, to the rear of a piston in a container or syringe. Thus, as the piston is moved in the container, liquid is dispensed from the tip and deposited on the substrate. Such dispensing systems can dispense a wide range of liquids having a wide range of viscosities, for example, water, resin material, conductive adhesive, cream solder, UV resin, silver paste and the other paste-like materials used in coating, dotting, fixing, filling, sealing and injecting processes used in the manufacture of electronics and many other fields of industry. The quantity of liquid dispensed can be large or small and is often determined by the operator running test dispense cycles of different times and pressures until a desired application of the liquid on the substrate is achieved.

With a container full of liquid, when pressure is applied to piston, the pressure builds rapidly to a desired dispense pressure PD as shown by the pressure-time curve in FIG. 6A; and the pressure is maintained at the desired dispense pressure throughout the dispensing cycle. As liquid is dispensed from the container, the chamber in the container behind the piston increases in size; and hence, a larger volume of air is required to reach the desired dispense pressure. Since air is a highly compressible fluid, a longer time is required to bring the dispenser up to the dispensing pressure; and with the dispensing cycle time fixed, the quantity of liquid dispensed and hence, the size of the liquid deposit, over the dispensing cycle will change. The degree of change will depend on the viscosity of the liquid and other factors. With less liquid in the container, the piston pressure may never reach the desired dispensing pressure as shown in FIG. 6B. Therefore, the operator must continuously adjust the pressure and/or cycle time as the liquid is dispensed from the container.

It is known to use smaller containers, so that the change in volume behind the piston is minimal; and a more consistent dispensing is achieved for a given dispensing pressure and time. However, that solution reduces the efficiency of the dispensing process by requiring more container changes. It also increases the cost of the dispensing process by requiring that more smaller containers be purchased, which also increases the waste generated by the process.

It is also known to automatically adjust the dispensing time in response to liquid being dispensed from the container. In one system, a first calibration is run during which an integration of pressure is determined as liquid is dispensed from the container. A controller stores a running sum of pressures with each time increment, that is, the integrated pressure, which represents the area under the pressure-time curve. Thus, for each time increment, the sum of the pressure integrals represents a quantity of liquid remaining in the container. A second calibration requires that times be measured and stored, which are required to dispense different quantities of liquid from the container. Those stored times also correlate to quantities of liquid remaining in the container. Therefore, over a dispensing cycle, a sum of integrated pressures is determined; and using the results of the first calibration, the control is able to determine the liquid remaining in the container. Based on the second calibration, the control is then able to correspondingly adjust the dispensing time. There are also known variations on this process including variations in the calibration processes as well as having the controller calculate a new dispensing time based on a generic formula.

The above process has several disadvantages. First, it requires multiple calibration processes; and each calibration process requires that a full container of liquid be dispensed until empty before calibration data can be utilized. Thus, the two calibration processes must be executed in an off-line, nonproduction environment, which is a time consuming and costly requirement. Second, finding an integral of the pressure requires that a full dispensing cycle be executed. Thus, any compensation based on the integrated pressure must be implemented on a subsequent dispensing cycle. Third, based on the pressure integral, the duration of a subsequent dispensing cycle is adjusted. While this process may work for manual dispensing processes, it is not practical with automated dispensing processes. In automated processes, a substrate is often moved past the dispenser on a conveyor; and most often, the dispensing process time is considered to be constant, so that conveyor motion past the dispenser can follow a fixed velocity profile. If the dispensing cycle time is constantly changing due to pressure compensation, the velocity profile of the conveyor moving the substrate must also be changed, as well as the timing of the downstream processes operating on the substrate.

Therefore, there is a need to provide an apparatus and a method of providing a simpler and more flexible system for maintaining a consistent quality in the application of the liquid onto the substrate as the liquid in the container is diminished.

SUMMARY OF THE INVENTION

The present invention provides a fluid dispensing system that is substantially simpler, more flexible and more time efficient than known dispensing systems. The dispensing system of the present invention has a setup procedure that is automatically run in a production environment and thus, faster than known calibration systems. Further, the setup procedure does not require a full container of liquid but, is equally effective with a partially used container. In addition, the dispensing system of the present invention provides a greater number of consistent, high quality dispensing cycles, thereby permitting the use of larger containers and providing a significant time and cost advantage for the user. Also, the dispensing system of the present invention does not compensate by changing the dispensing cycle time and therefore, is particularly useful in an automated fluid dispensing environment.

More specifically, using a container having any quantity of liquid in it, the fluid dispensing system of the present invention provides a setup process that automatically measures and stores pressure-time relationships with each dispensing cycle in a setup mode. Upon determining a desired liquid deposition, the operator is able to select, via a simple switch actuation, a desired pressure-time relationship that is stored for future use. Thereafter, in a run mode, all subsequent dispensing cycles are executed using the desired pressure-time relationship, thereby providing a consistent quantity of dispensed liquid with each dispensing cycle. Any time that the operator chooses another barrel, the setup mode is again selected, and a new pressure-time relationship is determined.

According to the principles of the present invention and in accordance with the described embodiments, the invention provides a fluid dispensing system having a fluid dispenser supporting a barrel containing liquid to be dispensed. The barrel has a slidable piston therein with the liquid on a forward piston side and a chamber on a rear piston side. A positive pressure fluid circuit has components operable to apply a positive fluid pressure to the rear side of the piston, and a negative pressure fluid circuit has components operable to apply a negative fluid pressure to the rear side of the piston. A pressure transducer is operable to sense a fluid pressure in the chamber; and a dispenser control has an input electrically connected to the pressure transducer and outputs electrically connected to the components in the positive and negative pressure fluid circuits. The dispenser control is operative to store a pressure-time relationship during a first dispensing cycle and thereafter, operate a component in the positive pressure fluid circuit to maintain the pressure-time relationship during a subsequent dispensing cycle. In one aspect of the invention, the pressure transducer is mounted on the fluid dispenser.

In another embodiment, the invention provides a method of operating a controller for a fluid dispensing system in which the controller operates the fluid dispensing system to execute a liquid dispensing cycle in response to operator inputs designating a setup mode and initiating a dispensing cycle. The controller determines a pressure-time relationship for the liquid dispensing cycle. The controller executes further liquid dispensing cycles and determines respective pressure-time relationships in response to respective operator inputs initiating further dispensing cycles. Next, the controller saves, in response to another operator input, a reference pressure-time relationship associated with a most recent liquid dispensing cycle. The controller then operates the fluid dispensing system to execute a subsequent liquid dispensing cycle in response to operator inputs designating a run mode and initiating a dispensing cycle. The controller maintains a pressure-time relationship during the subsequent liquid substantially equal to the reference pressure-time relationship.

These and other objects and advantages of the present invention will become more readily apparent during the following detailed description taken in conjunction with the drawings herein.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE ILLUSTRATIVE EMBODIMENTS

Figure 1:
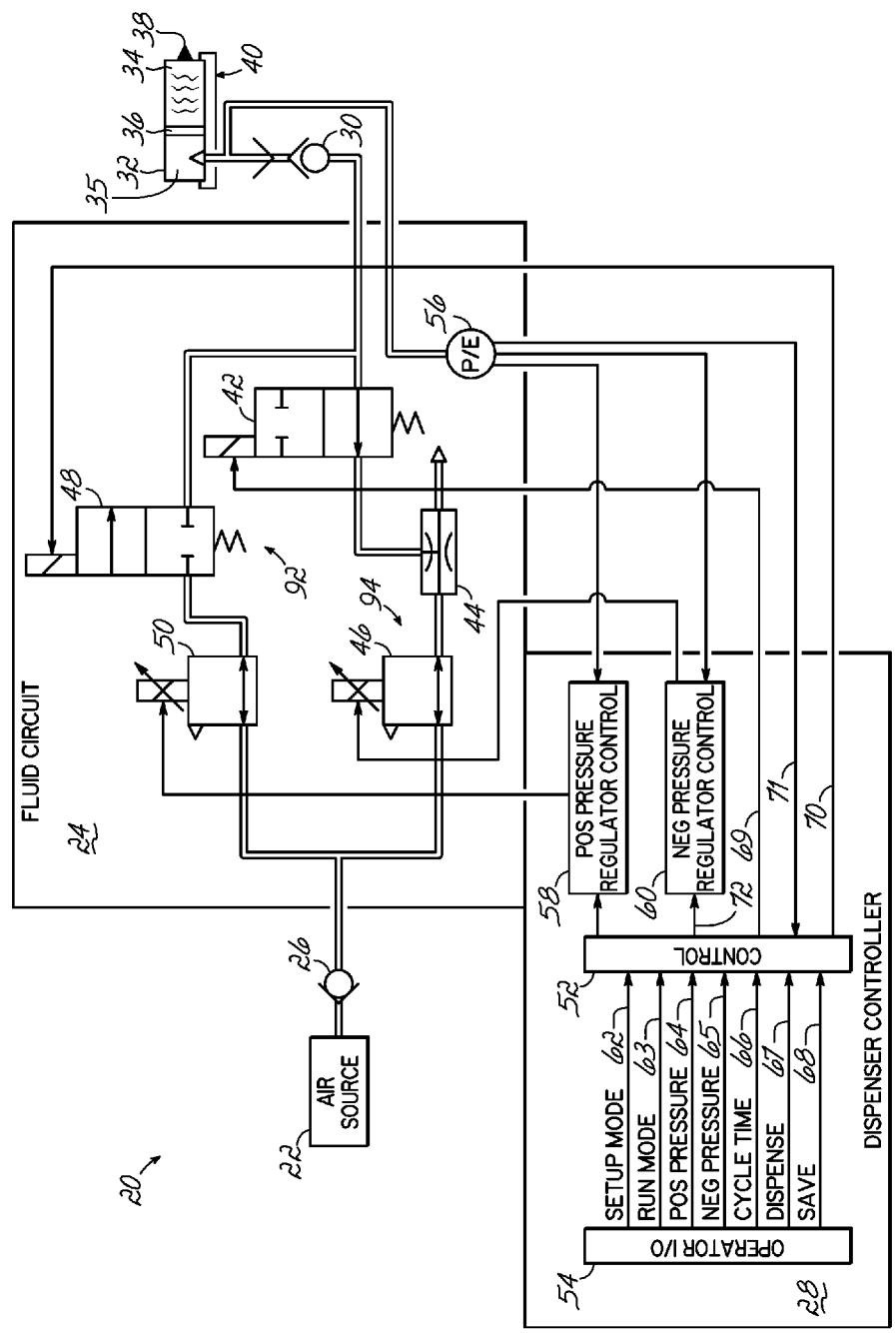
FIG. 1 is a schematic diagram of a first embodiment of a compensating pressure control system for a manual fluid dispenser in accordance with the principles of the present invention.

FIG. 1 illustrates a first embodiment of a manual dispensing system 20 in which a fluid source 22 supplies a pressurized fluid, for example, pressurized air, to a fluid circuit 24 via a connector 26. The fluid circuit 24 is operated by a dispenser controller 28 that commands the fluid circuit 24 to provide pressurized fluid via connector 30 to a fluid dispenser 40. The fluid dispenser 40 supports a barrel 32 having a liquid 34 stored therein. The barrel 32 is a substantially closed container with a piston 36 mounted for slidable motion therein. The piston 36 has the liquid 34 on a forward side and a fluid chamber 35 on a rear side. The pressurized fluid is supplied to the chamber 35 and applies a positive pressure against the rear side of the piston 36, thereby displacing the piston 36 within the barrel 32 and dispensing the liquid from a dispensing tip 38. An example of the fluid dispenser 40 is shown and described in copending U.S. patent application Ser. No. 10/887,001 entitled "Hand-Held Fluid Dispenser System and Method of Operating Hand-Held Fluid Dispenser Systems", which application is hereby incorporated in its entirety by reference herein.

The fluid circuit 24 has a negative pressure control valve 42 that, in its illustrated open state, passes a negative pressure fluid to the chamber 35 between dispensing cycles. For purposes of this document, the term "negative pressure" means a pressure less than atmospheric pressure; and the term "positive pressure" means a fluid pressure greater than atmospheric pressure. The negative pressure fluid is provided by a negative pressure generator 44, for example, a venturi, which receives positive pressure fluid from a negative pressure regulator 46. The negative pressure control valve 42, negative pressure generator 44, negative pressure regulator 46 and pressure transducer 56 form a negative pressure fluid circuit 94. A positive pressure control valve 48 is illustrated in its closed state but when opened, passes a pressurized fluid from the negative pressure regulator 46 to the rear portion of the piston 36. The positive pressure control valve 48, positive pressure regulator 50 and pressure transducer 56 form a positive pressure fluid circuit 92.

The dispenser controller 28 has a control 52 responsive to input signals provided by an operator I/O 54. The operator I/O 54 may include pushbuttons, switches, displays, and other devices that allow and facilitate the input of dispense parameters to the control 52 as well as display process conditions to the operator. The control 52 further receives an input signal from a pressure transducer or pressure sensor 56. The pressure transducer 56 continuously senses fluid pressure in the chamber 35 and provides one or more electrical signals representative of the sensed fluid pressure. The control 52 provides control signals to a positive pressure regulator control 58 and a negative pressure regulator control 60 that, in turn, are operative to adjust the pressures of the respective positive and negative pressure regulators 50, 46.

In FIG. 1, the pressure transducer 56 is physically mounted to the fluid dispenser 40 and thus, is able to more directly sense the pressure in the chamber 35 behind the piston 36. The transducer 56 more quickly captures a more accurate pressure related measurement in the chamber 35 than a pressure sensor that is mounted remotely from the fluid dispenser 40. Therefore, the closer proximity of the pressure sensor 56 to the chamber 35 improves the accuracy and responsiveness of a pressure sampling process described herein.

In dispensing liquid from the barrel 32, an operator uses the operator I/O 54 to select desired values for positive pressure, negative pressure and cycle time; and the operator I/O 54 provides corresponding signals to respective control inputs 64, 65, 66. The operator then actuates a dispense switch to provide a dispense signal on control input 67. The control 52 is responsive to the dispense signal to apply a positive pressure fluid to the chamber 35, thereby displacing the piston 34 within the barrel 32 and dispensing liquid from the dispensing tip 38. After a period of time determined by the cycle time on input 66, the control 52 applies a negative pressure fluid to the chamber 35 to quickly arrest the flow of liquid and to counteract a gravitational force on the liquid, thereby preventing liquid from dripping from the dispensing tip 38. The negative pressure fluid is often not used with higher viscosity liquids. The operator then observes the deposition of liquid onto a substrate and determines whether there should be any adjustments made to the positive pressure or the dispense time. After making an adjustment, a dispensing cycle is again executed; and the operator iterates that process until a satisfactory liquid deposition is achieved.

As described earlier, as liquid is dispensed from the barrel 32, the size of the chamber 35 increases. Therefore, for the quantity of dispensed liquid to remain constant over successive dispensing cycles, at the start of each dispense cycle, a successive greater flow rate of positive pressure fluid must be input to the chamber 35. Such a greater flow rate of positive pressure fluid is achieved by successively increasing the positive pressure. Often, the operator must continuously increase the positive pressure as the barrel 32 is emptied of liquid. As discussed earlier, this process requires substantial skill by the operator and makes for a relatively inefficient fluid dispensing process.

Figure 2:
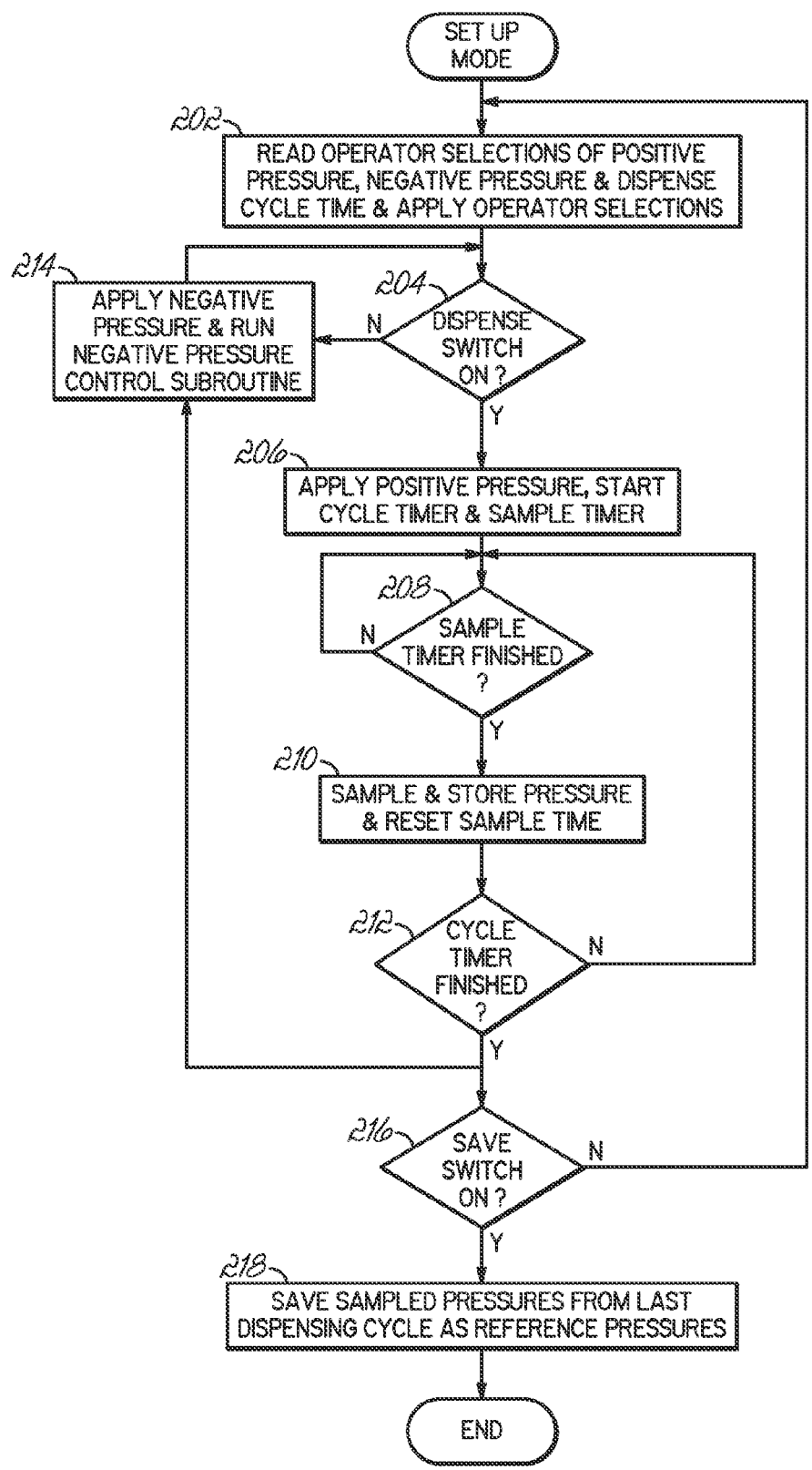
FIG. 2 is a flow chart illustrating a setup mode of operation for the compensating pressure control system of FIG. 1.

To address that problem, the control 52 executes a setup subroutine in response to the operator providing a setup mode signal on control input 62. Referring to FIG. 2, in the setup mode, the control 52 first, at 202, reads the signals on inputs 64, 65, 66 to determine the operator selected values for positive pressure, negative pressure and dispense cycle time, respectively. The control 52 then commands the positive pressure regulator control 58 and negative pressure regulator control 60 to adjust the respective regulators 50, 46 to the operator selected pressures. Upon the operator actuating the dispense switch, the control 52 detects, at 204, a dispense signal on control input 67 and immediately, at 206, provides signals on control outputs 69, 70 causing the negative pressure control valve 42 to close and the positive pressure control valve 48 to open, thereby applying positive pressure fluid to the chamber 35. In addition, the control 52 starts an internal cycle timer and an internal sample timer. Upon detecting, at 208, the sample timer timing out, the control 52 samples, at 210, a pressure value on control input 71 from the pressure transducer 56 and resets the sample timer. A pressure value is then stored based on one or more pressure samples in association with a corresponding sample time. As will be appreciated, the pressure sampling process often requires that several pressure samples be taken and processed to remove noise and other artifacts prior to providing a single pressure value that is stored for future use.

Next, at 212, the control 52 determines whether the cycle timer has timed out. If not, the control 52 iterates the process steps 208 and 210 to continue to sample and store pressure values over the dispensing cycle. When the cycle timer time out is detected, the control 52, at 214, provides output signals commanding the positive pressure control valve 48 to close and the negative pressure control valve 42 to open. In addition, the control 52 executes a negative pressure control subroutine during which the pressure sensor 56 is periodically sampled and compared to the negative pressure selected by the operator. If there is any difference between those pressures, the control 52 commands the negative pressure regulator control 60 to adjust the negative pressure regulator 46 by an amount equal to that difference. Thus, during the time between dispense cycles, the negative pressure in the chamber 35 is maintained at the negative pressure selected by the operator.

As noted earlier, it may require several dispensing cycles before the operator finds a positive pressure value and dispensing cycle time that produces the desired deposition of liquid onto a substrate. However, during each of those dispensing cycles, the control 52 is executing the setup mode process described with respect to process steps 202 to 214. When the desired deposition is achieved, the operator then uses the operator I/O 54 to provide a save signal on input 68 to the control 52. Upon the control detecting the save input at 216, it proceeds, at 218, to identify the stored pressure values for the immediately preceding dispensing cycle as reference pressure values to be subsequently used in the run mode routine illustrated in FIG. 3. Thus, the stored reference pressure values in association with their respective sample times represent a desired pressure-time relationship over the dispensing cycle.

Upon completing the setup mode by finding a set of desired positive pressure and dispense time values, the operator then provides, via the operator I/O 54, a run mode signal on input 63 of control 52. Upon detecting the run mode signal, the control 52 executes the run mode routine illustrated in FIG. 3. The operator then proceeds to execute another dispensing cycle. Upon detecting the dispense switch being activated at 302, the computer 52 then proceeds, at 304, to switch the states of the control valves 42, 48, thereby removing the negative pressure fluid and applying positive pressure fluid to the chamber 35. In addition, the cycle and sample timers are started. Normally, the sample timer operating during the run mode has the same frequency or sample time interval as the sample timer that was used during the setup mode. Hence, there will be a one-to-one time correspondence between the reference pressure values and the pressure values resulting from the pressure samples taken during the current dispensing cycle; and thus, it will be easier to reproduce the pressure-time relationship represented by the reference pressures in the current dispensing cycle. Upon detecting, at 306, the sampled timer has timed out, the control 52, at 308, samples and stores a pressure value from the pressure transducer 56 and resets the sample timer. The control 52 then, at 310, determines the difference between the stored pressure value and a corresponding reference pressure value that was determined during the setup mode. Upon detecting a difference, the control 52 provides, at 312, a signal on output 72 to the positive pressure regulator control 58, thereby causing it to adjust the positive pressure regulator 50 to provide an increased positive pressure that is equal to the reference pressure. Upon detecting, at 316, that the cycle timer is not finished, the control 52 then iterates the process of steps 306-312. Thus, during each sample time, the fluid applied to the chamber 35 maintains a positive pressure equal to the positive pressure reference values. Thus, the pressures that were stored at the end of the setup mode as the reference pressures are duplicated during corresponding sample times of this subsequent dispensing cycle. Providing substantially the same pressures over corresponding times during the subsequent dispensing cycle provides substantially the same quantity of liquid being dispensed from the barrel 32.

Upon detecting, at 316, that the cycle timer is finished, the control 52 then, at 314, switches the states of the negative and positive control valves 42, 48 to remove the positive pressure fluid and apply the negative pressure fluid. In addition, the control 52 executes a negative pressure control subroutine as previously described with respect to process step 214 of FIG. 2.

Figure 4:
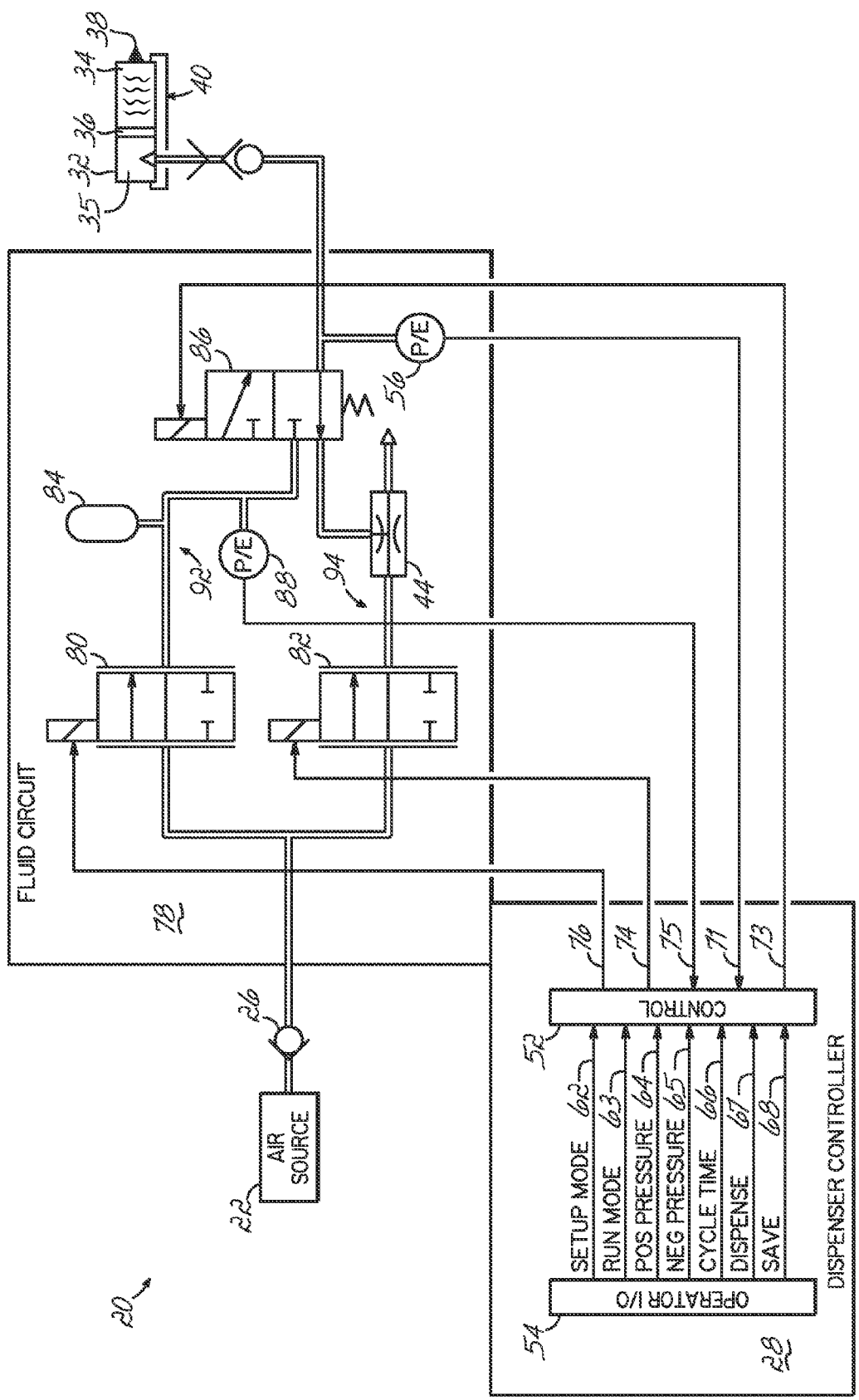
FIG. 4 is a schematic diagram of a second embodiment of a compensating pressure control system for a manual fluid dispenser in accordance with the principles of the present invention.

FIG. 4 illustrates a second embodiment of the compensating pressure controller 28 in which the fluid circuit 78 replaces the fluid circuit 24 of FIG. 1. In this embodiment, the positive and negative pressure regulators 46, 50 and respective pressure regulator controls 60, 58 of FIG. 1 are replaced by respective positive and negative pressure proportional valves 80, 82 and an accumulator 84 as shown in FIG. 4. Further, the control valves 42, 48 of FIG. 1 are consolidated into a single switching valve 86. Components in FIG. 4 that are common to FIG. 1 are identically numbered and have substantially the same function as previously described with respect to FIG. 1. However, it should be noted that, in FIG. 4, the pressure transducer 56 is mounted remote from the fluid dispenser 40. Therefore, it will be slightly less responsive than if it were mounted on the fluid dispenser 40. A positive pressure fluid circuit 92 is formed by the positive pressure proportional valve 80, accumulator 84, pressure transducers 56, 88 and a portion of switching valve 86 that passes a positive pressure therethrough. A negative pressure fluid circuit 94 is formed by the negative pressure proportional valve 82, negative pressure generator 44, pressure transducer 56, and a portion of the switching valve that passes a negative pressure therethrough.

Figure 3:
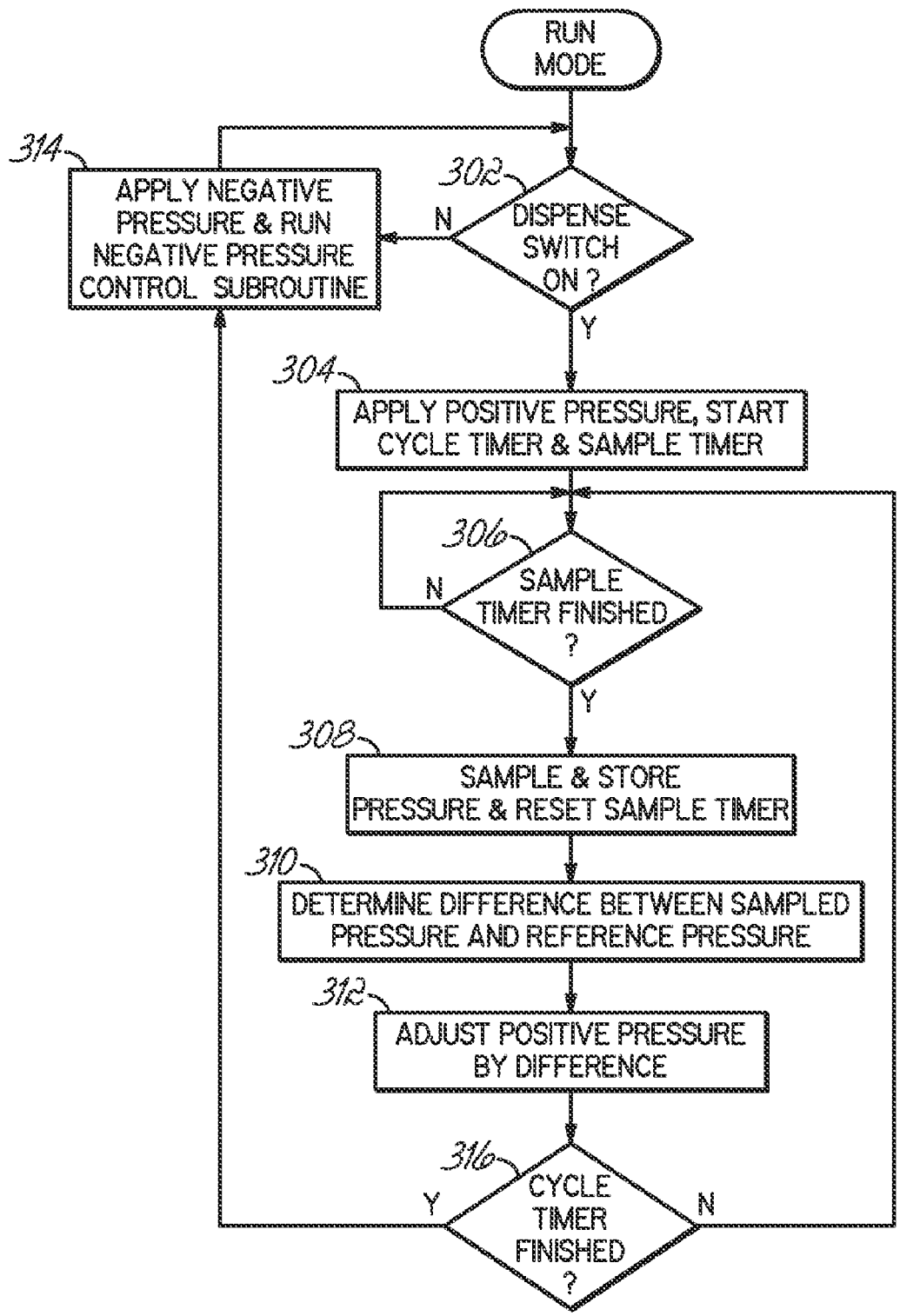
FIG. 3 is a flow chart illustrating a run mode of operation for the compensating pressure control system of FIG. 1.

The dispenser controller 28 is operative with the fluid circuit 78 of FIG. 4 to execute the setup mode of FIG. 2 and run mode of FIG. 3 substantially as previously described. The only difference is how the fluid circuit 78 applies the positive and negative pressures to the chamber 35. Upon the expiration of the dispensing cycle timer, the control 52 provides a signal on output 73 to the switching valve 86 causing the valve 86 to switch to the position illustrated in FIG. 4 in which the negative pressure generator 44 provides a negative pressure fluid to the chamber 35. During the time between dispensing cycles, the control 52 samples the pressure from pressure transducer 56 and compares that pressure to the negative pressure selected by the operator on input 65. If a difference is determined, the control 52 provides a signal on output 74 to the negative pressure proportional valve 82 causing the proportional valve 82 to change the flow of pressurized fluid such that the negative pressure applied to the chamber 35 becomes equal to the negative pressure selected by the operator.

Further, during the time between dispensing cycles, the control 52 samples the pressure from pressure transducer 88 on control input 75 and compares it to the positive pressure selected by the operator on input 64. If there is a difference between those pressures, the control 52 provides a signal on output 76 to the positive pressure proportional valve 80 causing it to open sufficiently to charge the accumulator 84 until by monitoring the pressure sensor 88, the control 52 determines that the accumulator is charged to a pressure appropriate for the next dispensing cycle.

Upon the control 52 detecting an operator initiated change of state of the dispense signal on input 67, it provides an output signal commanding the switching valve 86 to change state, thereby removing the negative pressure fluid and connecting the positive pressure fluid to the chamber 35. The positive pressure fluid is provided by the accumulator 84. During the dispensing cycle, the control 52 samples the pressure from the pressure transducer 56 and compares that to the operator selected positive pressure on input 64. If there is a difference, the control 52 provides an output signal commanding the positive pressure proportional valve 80 to change the flow of pressurized fluid, so that positive pressure applied to the chamber 35 becomes substantially equal to the operator selected positive pressure.

Figure 5:
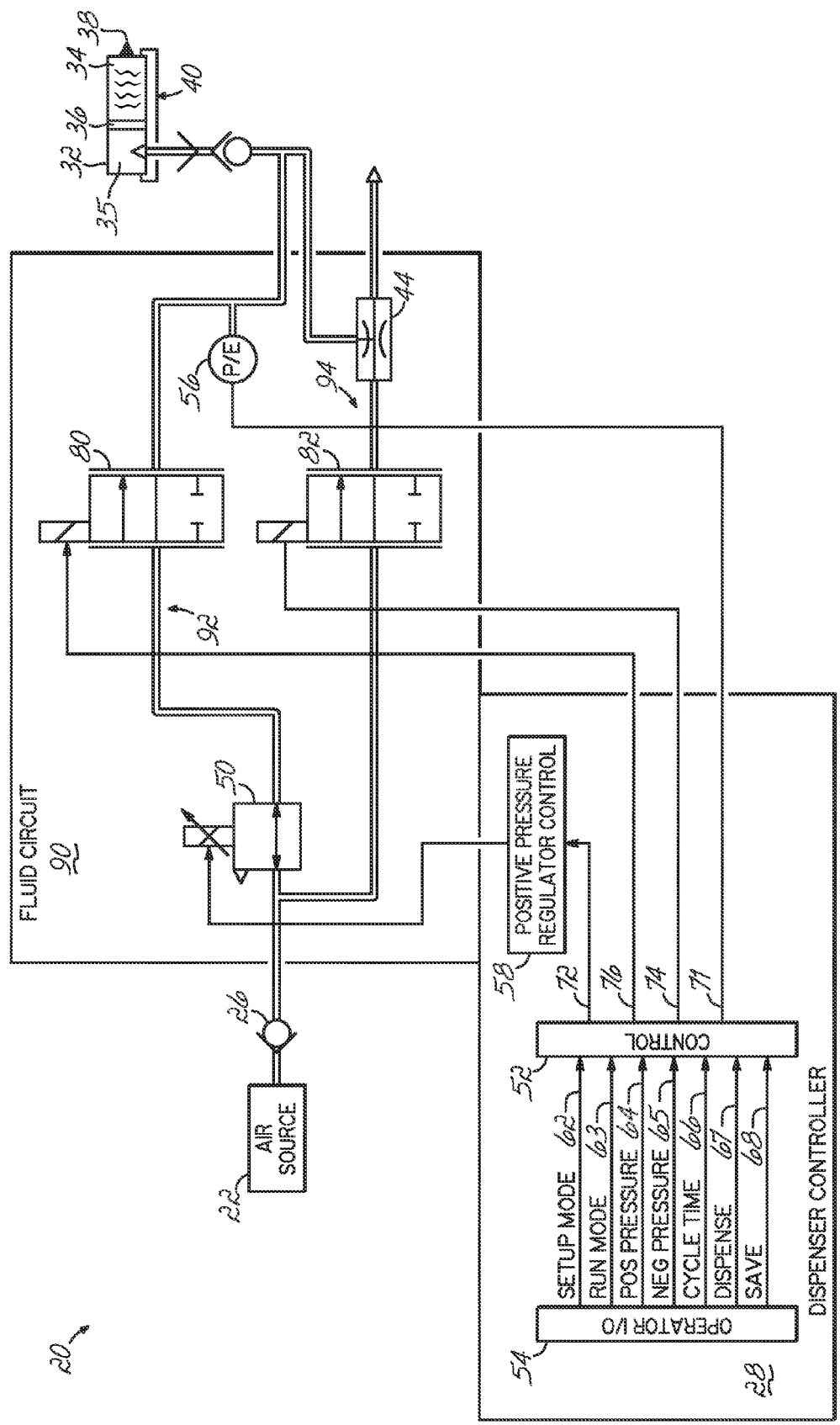
FIG. 5 is a schematic diagram of a third embodiment of a compensating pressure control system for a manual fluid dispenser in accordance with the principles of the present invention.
Figure 6A:
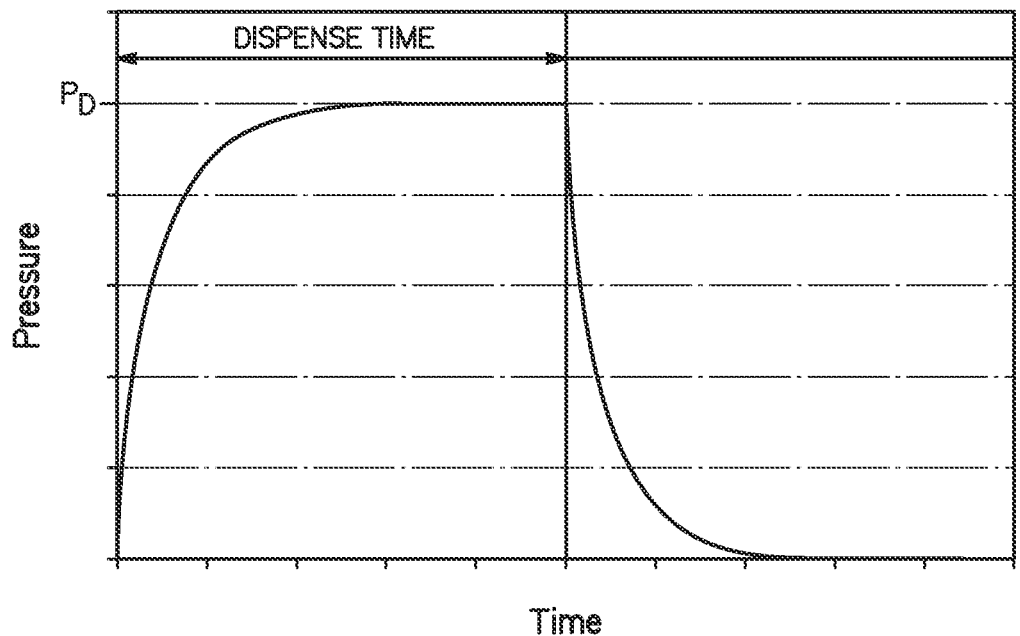
FIG. 6A illustrates a pressure and time relationship for a manual fluid dispenser having a full barrel of liquid.
Figure 6B:
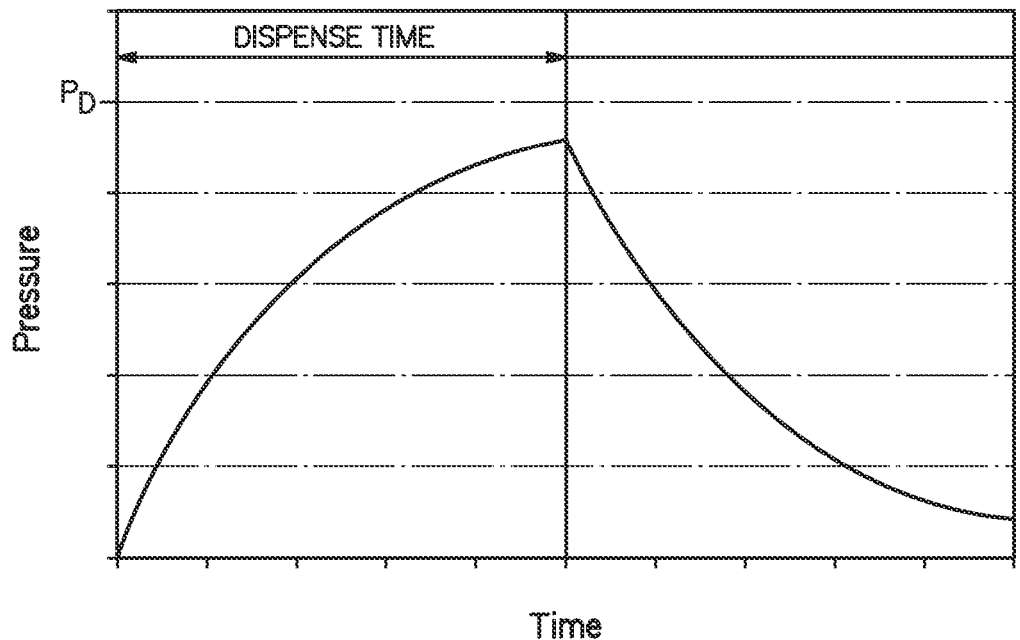
FIG. 6B illustrates a pressure and time relationship for a manual fluid dispenser having only a portion of the barrel filled with liquid.

FIG. 5 illustrates a second embodiment of the dispensing system 20 in which a fluid circuit 90 is used in conjunction with the dispenser controller 28. Again, components in FIG. 5 that are common to FIGS. 1 and 4 are identically numbered and have substantially the same function as previously described with respect to FIGS. 1 and 4. As with the other embodiments, the dispenser controller 28 is operative with the fluid circuit 90 to execute both the setup and run modes of FIGS. 2 and 3 previously described. Again, the only difference is how the fluid circuit 90 applies positive and negative pressure fluids to the chamber 35. A positive pressure fluid circuit 92 is formed by positive pressure regulator 50, positive pressure proportional valve 80, and pressure transducer 56. A negative pressure fluid circuit 94 is formed by the negative pressure proportional valve 82, negative pressure generator 44, and pressure transducer 56.

In this embodiment, upon the control 52 detecting the cycle timer timing out indicating the end of a dispensing cycle, signals are provided on outputs 76, 74 commanding the positive pressure proportional valve 80 to close and the negative pressure proportional valve 82 to open. With the proportional valve 82 open, the negative pressure generator 44 provides a negative pressure fluid to the chamber 35. During the time between dispensing cycles, the control 52 samples pressure values from the pressure transducer 56 and compares the sampled pressure values to the operator selected negative pressure on input 65. If there is a difference, the control 52 provides an output signal commanding the negative pressure proportional valve 82 to change the fluid flow therethrough causing the negative pressure in the chamber 35 to be substantially equal to the operator selected negative pressure.

Upon detecting an operator initiated dispense cycle on input 67, the control 52 provides output signals commanding the negative pressure proportional valve 80 to close and the positive pressure proportional valve 80 to open, thereby providing a positive pressure fluid to the chamber 35. During the dispensing cycle, the control 52 samples pressure from the pressure transducer 56 and compares the sampled pressure to the operator selected positive pressure on input 64. If there is a difference, the control 52 provides an output signal to the positive pressure regulator control 50 causing it to change the positive pressure regulator 80, so that the pressure in the chamber 35 becomes substantially equal to the operator selected positive pressure.

To summarize, using a barrel having any quantity of liquid in it, the fluid dispensing system 20 provides a setup process that automatically measures and stores pressure-time relationships with each dispensing cycle in a setup mode. Upon determining a desired liquid deposition, the operator is able to select, via a simple switch actuation, a desired pressure-time relationship that is stored for future use. Thereafter, in a run mode, all subsequent dispensing cycles are executed using the desired pressure-time relationship, thereby providing a consistent quantity of dispensed liquid with each dispensing cycle. Anytime the operator chooses another barrel, the setup mode is again selected, and a new pressure-time relationship is determined.

Thus, the dispensing system 20 provides several advantages. First, the setup mode is executed while the operator is dispensing fluid to determine the desired pressure and cycle time parameters. Therefore, production time is not lost to perform an offline calibration of the dispensing system. Second, the setup mode is effective with a barrel having any amount of liquid remaining in it. The system does not require the use of a full barrel to achieve desired reference pressure values, so the operator is free to use any barrel of liquid that is available. Third, the ability of the dispensing system to maintain a desired pressure and provide numerous consistent, high quality dispensing cycles permits the use of larger barrels. This provides a significant time and cost advantage for the user. Fourth, the dispensing system achieves the desired pressure control without changing the operator selected dispensing cycle time. Thus, the dispensing system is equally useful in manual and automated dispensing systems.

While the present invention has been illustrated by a description of several embodiments, and while such embodiments have been described in considerable detail, there is no intention to restrict, or in any way limit, the scope of the appended claims to such detail. Additional advantages and modifications will readily appear to those skilled in the art. For example, in the embodiments herein, the dispensing system 20 is described in association with a manual fluid dispenser 40; however, as will be appreciated, in alternative embodiments, the pressure control system of the fluid dispensing system 20 is equally applicable to automated fluid dispensing systems. Further, in the embodiments of FIGS. 4 and 5, the pressure transducer 56 is mounted remotely from the fluid dispenser 40; however, as will be appreciated, in alternative embodiments of FIGS. 4 and 5, the pressure transducer 56 can be mounted on the fluid dispenser 40 as shown in FIG. 1. In addition, in the embodiments described herein, electrically controlled pressure regulators are used, however, as will be appreciated, in alternative embodiments, mechanical pressure regulators may be used Therefore, the invention in its broadest aspects is not limited to the specific details shown and described. Consequently, departures may be made from the details described herein without departing from the spirit and scope of the claims which follow.

What is claimed is:

1. A fluid dispensing system for dispensing a liquid, comprising:
    a fluid dispenser supporting a barrel including a piston therein, the barrel including a chamber on a rear side of the piston and a liquid on a forward side of the piston;
    a positive pressure fluid circuit comprising components operable to apply a positive fluid pressure to the rear side of the piston;
    a negative pressure fluid circuit comprising components operable to apply a negative fluid pressure to the rear side of the piston;
    a first pressure transducer operable to sense a fluid pressure in the chamber; and
    a dispenser control having an input electrically connected to the first pressure transducer and outputs electrically connected to a component in the positive pressure fluid circuit and to a component in the negative pressure fluid circuit, the dispenser control storing a pressure-time relationship during a first dispensing cycle of the barrel and thereafter, operating the component in the positive pressure fluid circuit to maintain the pressure-time relationship during each subsequent dispensing cycle of the barrel such that the dispensing cycle time is the same for each dispensing cycle.

2. The fluid dispensing system of claim 1 wherein the positive pressure fluid circuit comprises a valve operable by the control to supply a positive pressure fluid to the chamber and the negative pressure fluid circuit comprises a valve operable by the control to supply a negative pressure fluid to the chamber.

3. The fluid dispensing system of claim 1 wherein the first pressure transducer is adapted to be mounted on the fluid dispenser.

4. The fluid dispensing system of claim 1, further comprising:
    a dispensing valve operable to supply a fluid to the chamber, the dispensing valve being switchable between
        a first state connecting a dispensing valve output with a positive pressure input of the dispensing valve, and
        a second state connecting the dispensing valve output with a negative pressure input of the dispensing valve;
    a fluid accumulator in fluid communication with the positive pressure input;
    a positive pressure proportional valve operable to provide a positive pressure fluid to the positive pressure input of the dispensing valve;
    a second pressure transducer operable to sense a pressure of the positive pressure fluid;
    a negative pressure generator operable to provide a negative pressure fluid to the negative pressure input of the dispensing valve;
    a negative pressure proportional valve in fluid communication with the negative pressure generator; and
    wherein the dispenser control includes inputs electrically connected to the first pressure transducer and the second pressure transducer and outputs electrically connected to the positive pressure proportional valve and the negative pressure proportional valve, the dispenser control being operative to store a pressure-time relationship during a first dispensing cycle and thereafter, operate the positive pressure proportional valve to maintain the pressure-time relationship during a subsequent dispensing cycle.

5. The fluid dispensing system of claim 4 wherein the first pressure transducer is adapted to be mounted on the fluid dispenser.

6. The fluid dispensing system of claim 1, further comprising:
    a positive pressure proportional valve operable to supply a positive pressure fluid to the chamber;
    a positive pressure regulator in fluid communication with the positive pressure proportional valve;
    a negative pressure generator operable to supply a negative pressure fluid to the chamber; and a negative pressure proportional valve in fluid communication with the negative pressure generator;

wherein the dispenser control includes an input electrically connected to the first pressure transducer and outputs electrically connected to the positive pressure proportional valve, the negative pressure proportional valve and the positive pressure regulator, the dispenser control being operative to store a pressure time-relationship during a first dispensing operation and thereafter, operate the positive pressure proportional valve to maintain the pressure-time relationship during a subsequent dispensing cycle.

7. The fluid dispensing system of claim 6 wherein the first pressure transducer is adapted to be mounted on the fluid dispenser.

8. The fluid dispensing system of claim 1 wherein the pressure-time relationship corresponds to a dispensing cycle time, the dispensing cycle time remaining constant for each subsequent dispensing cycle of the barrel.

9. A fluid dispensing system for dispensing a liquid, comprising:
 a fluid dispenser supporting a barrel including a piston therein, the barrel including a chamber on a rear side of the piston and a liquid on a forward side of the piston;
 a positive pressure fluid circuit comprising components operable to apply a positive fluid pressure to the rear side of the piston;
 a negative pressure fluid circuit comprising components operable to apply a negative fluid pressure to the rear side of the piston;
 a first pressure transducer operable to sense a fluid pressure in the chamber; and
 a dispenser control having an input electrically connected to the first pressure transducer and outputs electrically connected to a component in the positive pressure fluid circuit and to a component in the negative pressure fluid circuit, the dispenser control being operative to store a pressure-time relationship during a first dispensing cycle of the barrel and thereafter, operate the component in the positive pressure fluid circuit to maintain the pressure-time relationship during each subsequent dispensing cycle of the barrel;
 wherein the component of the positive pressure fluid circuit coupled to the outlet of the dispenser control comprises a positive pressure regulator.

10. The fluid dispensing system of claim 9 wherein the positive pressure regulator continuously adjusts the fluid pressure provided to the chamber to maintain the pressure-time relationship in the subsequent dispensing cycles of the barrel.

11. A fluid dispensing system for dispensing a liquid, comprising:
 a fluid dispenser supporting a barrel including a piston therein, the barrel including a chamber on a rear side of the piston and a liquid on a forward side of the piston;
 a positive pressure fluid circuit comprising components operable to apply a positive fluid pressure to the rear side of the piston;
 a first pressure transducer operable to sense a fluid pressure in the chamber; and
 a dispenser control having an input electrically connected to the first pressure transducer and an output electrically connected to a component in the positive pressure fluid circuit, the dispenser control storing a pressure-time relationship during a first dispensing cycle of the barrel and thereafter, operating the component in the positive pressure fluid circuit to maintain the pressure-time relationship during each subsequent dispensing cycle of the barrel such that the dispensing cycle time is the same for each dispensing cycle.

12. The fluid dispensing system of claim 11 wherein the positive pressure fluid circuit comprises a valve operable by the control to supply a positive pressure fluid to the chamber.

13. The fluid dispensing system of claim 11 wherein the first pressure transducer is adapted to be mounted on the fluid dispenser.

14. The fluid dispensing system of claim 11 wherein the pressure-time relationship corresponds to a dispensing cycle time, the dispensing cycle time remaining constant for each subsequent dispensing cycle of the barrel.

15. A fluid dispensing system for dispensing a liquid, comprising:
 a fluid dispenser supporting a barrel including a piston therein, the barrel including a chamber on a rear side of the piston and a liquid on a forward side of the piston;
 a positive pressure fluid circuit comprising components operable to apply a positive fluid pressure to the rear side of the piston;
 a first pressure transducer operable to sense a fluid pressure in the chamber; and
 a dispenser control having an input electrically connected to the first pressure transducer and an output electrically connected to a component in the positive pressure fluid circuit, the dispenser control being operative to store a pressure-time relationship during a first dispensing cycle of the barrel and thereafter, operate the component in the positive pressure fluid circuit to maintain the pressure-time relationship during each subsequent dispensing cycle of the barrel;
 wherein the component of the positive pressure fluid circuit coupled to the outlet of the dispenser control comprises a positive pressure regulator.

16. The fluid dispensing system of claim 15 wherein the positive pressure regulator continuously adjusts the fluid pressure provided to the chamber to maintain the pressure-time relationship in the subsequent dispensing cycles of the barrel.

* * * * *